United States Patent [19]

Borland et al.

[11] Patent Number: 5,452,738
[45] Date of Patent: Sep. 26, 1995

[54] CRASHWORTHY SOLENOID ACTUATED VALVE FOR CNG POWERED VEHICLE

[75] Inventors: Robin N. Borland, McMurray; David E. Hughes, Pittsburgh, both of Pa.

[73] Assignee: Amcast Industrial Corporation, Dayton, Ohio

[21] Appl. No.: 200,075

[22] Filed: Feb. 22, 1994

[51] Int. Cl.⁶ .......................... F16K 31/06; F16K 17/38; F16K 39/02
[52] U.S. Cl. .............. 137/265; 137/74; 137/613; 137/630.15; 251/129.15; 251/144
[58] Field of Search ................ 251/144, 129.15, 251/332; 222/3, 504; 137/74, 265, 613, 630.15

[56] References Cited

U.S. PATENT DOCUMENTS

| | | | |
|---|---|---|---|
| 2,624,542 | 1/1953 | Ghormley | 251/332 |
| 4,744,383 | 5/1988 | Visnic et al. | 137/74 X |
| 4,988,073 | 1/1991 | Cristiani | 251/129.15 X |
| 5,188,017 | 2/1993 | Grant et al. | |
| 5,193,580 | 3/1993 | Wass et al. | 251/144 X |
| 5,197,710 | 3/1993 | Wass et al. | |
| 5,255,809 | 10/1993 | Ervin et al. | |
| 5,255,855 | 10/1993 | Maier et al. | 251/129.15 X |
| 5,294,904 | 3/1994 | Volz | 251/129.15 X |

FOREIGN PATENT DOCUMENTS 922433  4/1963  United Kingdom.

*Primary Examiner*—Gerald A. Michalsky
*Attorney, Agent, or Firm*—Killworth, Gottman, Hagan & Schaeff

[57] ABSTRACT

A bidirectional solenoid operated valve for controlling the flow of a compressed gas to and from a pressurized vessel is provided which automatically blocks the flow of gas out of a cylinder to a gas line in the event of an electrical failure or crash and which will not fail catastrophically in the event of a crash. The bidirectional valve includes a manual lockdown feature, an integral electrical pass through assembly, and a thermally activatable pressure relief device.

16 Claims, 5 Drawing Sheets

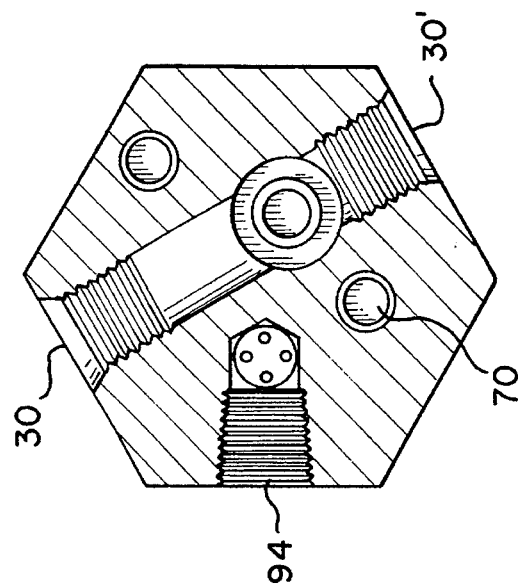
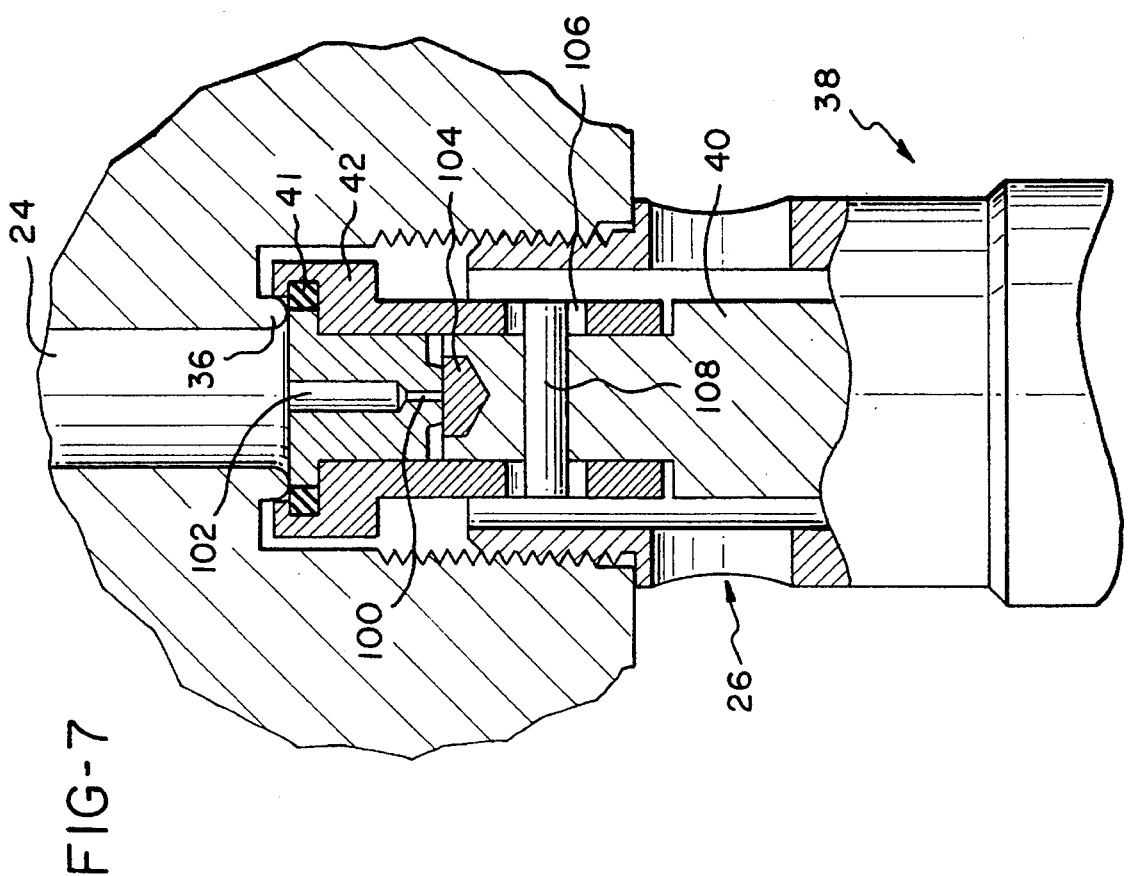

5,452,738

CRASHWORTHY SOLENOID ACTUATED VALVE FOR CNG POWERED VEHICLE

BACKGROUND OF THE INVENTION

This invention relates to valves for use with vessels containing gas under pressure, and more particularly to a crashworthy solenoid actuated valve for use in compressed natural gas powered vehicles.

Because of environmental concerns and emissions laws and regulations, manufacturers of motor vehicles are searching for a clean burning and cost efficient fuel to use as an alternative to gasoline. Natural gas is one candidate for such a purpose, and many vehicles have been converted to natural gas as a fuel source. Typically, the natural gas is stored on board the vehicle in compressed form in one or more pressurized cylinders.

Valves which control the supply of compressed natural gas (CNG) to the engine of a vehicle are exposed to large variations in environmental conditions. For example, wide variations in temperatures may be encountered. This variation in temperature may result in the nominal working pressure in a gas cylinder to vary several hundred up to a few thousand pounds per square inch (psi). Thus, the control valve must be able to handle high gas pressures without failure.

Further, in the event of a crash, the gas valve must not fail in an unsafe or catastrophic manner. Additionally, it is desirable that the valve close automatically in the event of an electrical failure or indication of a crash.

Grant et al, U.S. Pat. No. 5,188,017, teaches a natural gas cylinder fitting and solenoid valve which can be used to control the flow of CNG from a pressurized source to an engine of a vehicle. Both externally-mounted and internally-mounted embodiments are shown, Internal mounting of the valve within the pressurized cylinder provides additional protection from a crash. Wass et al, U.S. Pat. Nos. 5,193,580 and 5,197,710 also teach internally-mounted, solenoid controlled gas valves for use in CNG powered vehicles. The '580 patent also includes a manual override feature which can be used to block the flow of compressed gas from the cylinder to a gas line.

However, while the Grant and Wass valves are stated to be crash resistant or crash proof, in the event of an accident which causes the exposed portions of the valves to be sheared off from the neck of the pressurized gas cylinder, the valves would not be able to block the flow of gas out of the cylinder as the inlet, outlet, and electrical feed through connections all communicate with the gas in the cylinder. Accordingly, there remains a need in this art for a crashworthy solenoid actuated valve for CNG powered vehicles which will automatically block the flow of gas out of a cylinder to a gas line in the event of an electrical failure or crash and which will not fail catastrophically in the event of a crash. Further, there remains a need for such a valve which can withstand high pressures without leakage over a range of temperatures.

SUMMARY OF THE INVENTION

The present invention meets those needs by providing a bidirectional valve for controlling the flow of a compressed gas to and from a pressurized vessel which automatically blocks the flow of gas out of a cylinder to a gas line in the event of an electrical failure or crash and which will not fail catastrophically in the event of a crash. The bidirectional valve of the present invention can withstand high pressures without leakage of gas over a range of temperatures.

According to one aspect of the present invention, a bidirectional valve which includes a valve body having a gas flow passage extending through the valve body and having first and second ends. The first end of the gas flow passage communicates with the interior of the pressurized vessel, and the second end of the gas flow passage communicates with an outlet port on the valve body. The valve also includes a valve seat in the gas flow passage and a solenoid valve which mates with the valve seat to seal the gas flow passage. The solenoid valve includes a poppet body slidable in the gas flow passage. The poppet body has a head for sealing against the valve seat to close the gas flow passage. The solenoid valve further includes a solenoid core having a return spring for biasing the poppet body and poppet head toward the valve seat, and a solenoid coil for causing the solenoid core to move away from the poppet body.

In a preferred embodiment of the invention, the solenoid valve is mounted adjacent the first end of the gas flow passage and internally within the pressurized cylinder in a manner which shields the working components of the valve from damage in the event of a crash or impact. Preferably, the valve seat is located in the valve body and gas flow passage so that it is within the interior of the cylinder when the valve is in place so that in the event of an impact which sheared off any exposed portions of the valve, the poppet head would maintain its position sealed against the valve seat, preventing the flow of gas out of the valve.

To provide a separate means for closing the valve, an optional manual lockdown valve is positioned in the gas flow passage between the valve seat and the outlet port for selectively preventing the flow of gas from the pressurized vessel to the outlet port. Such a manual lockdown valve may be used for pressurization tests of the valve. In this embodiment, the gas flow passage further includes a second valve seat, and the manual lockdown valve includes a resilient gasket for sealing against the second valve seat.

The manual lockdown valve further includes a gasket holder having a top wall and side walls forming an annular chamber with the resilient gasket mounted therein, the gasket holder and gasket each having respective orifices therein which form a bleed path for gas when the manual lockdown valve is in an open position. In this manner, high pressure gas cannot become trapped behind the gasket and unseat it from the gasket holder. To ensure that the manual lockdown valve functions as a bidirectional seal in its closed position, the gasket holder includes an annular ridge (seat) on the interior of the top wall to seal against the gasket.

The valve also includes means for connecting the solenoid to a source of electrical power. Preferably, this comprises an annular passage through the valve body, a plug sealing the passage and including at least one integral electrically conductive pin extending through the plug, and at least one wire electrically connecting the solenoid valve to the at least one pin. The plug is formed of a ceramic material to provide a seal which withstands the high gas pressures associated with the valve, and the pin is brazed to the plug. On the outlet end of the annular passage, an electrical connector which mates with the at least one pin is provided.

Accordingly, it is a feature of the present invention to provide a bidirectional valve for controlling the flow of a compressed gas to and from a pressurized vessel which automatically blocks the flow of gas out of the cylinder to a gas line in the event of an electrical failure or crash and which will not fail catastrophically in the event of a crash.

It is a further feature of the present invention to provide a bidirectional valve which can withstand high pressures without gas leakage over a range of temperatures. These, and other features and advantages of the present invention will become apparent from the following detailed description, the accompanying drawings, and the appended claims.

BRIEF DESCRIPTION OF THE DRAWINGS

FIG. 7 is an enlarged cross-sectional view of the poppet head and body of the solenoid valve shown in FIG. 2; and FIG. 8 is a top sectional view taken along line 8—8 in FIG. 4.

DETAILED DESCRIPTION OF THE PREFERRED EMBODIMENTS

Figure 1:
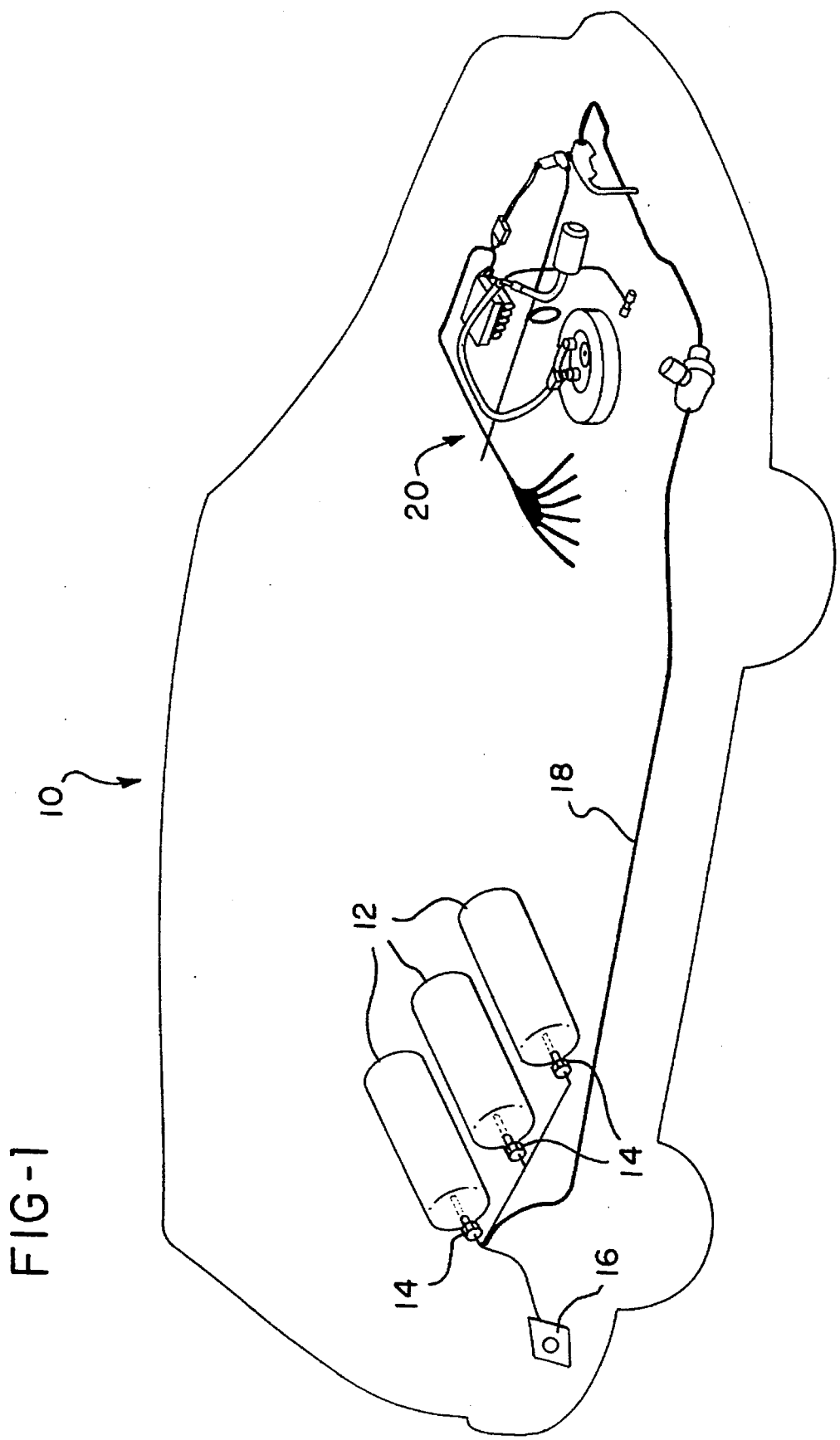
FIG. 1 is a schematic representation of a vehicle adapted to be powered by compressed natural gas stored on board in pressurized cylinders, and illustrating the general positioning of the bidirectional valves of the present invention.

Referring now to FIG. 1, a vehicle 10 adapted to be powered by compressed natural gas is shown schematically. The vehicle includes one or more pressurized vessels or cylinders 12, each including a bidirectional valve 14 mounted internally within the vessel. Each cylinder is designed to be able to withstand nominal working pressures of up to 3600 psi, and the valve 14 also is designed to be able to handle those pressures without leakage. Valve 14 may be fabricated of brass, steel, stainless steel, or aluminum, and may include plating or other surface treatment to resist corrosion.

A fuel inlet 16 is provided to supply additional compressed natural gas (CNG) to cylinders 12 as needed. Preferably, the fuel inlet includes a check valve to prevent back flow of the gas. The valve 14 is designed, as explained in greater detail below, so that the pressure of the fuel from the filling supply automatically opens the valve. Further, valve 14 includes common fuel fill and fuel supply ports to simplify piping requirements.

Upon demand from the engine, the CNG fuel flows along fuel line 18 to a fuel injection system shown generally at 20. Depending upon the design, the engine may comprise a computer-controlled gaseous fuel injection engine or may be adapted to run on more than one fuel by selectively changing fuel sources.

Figure 2:
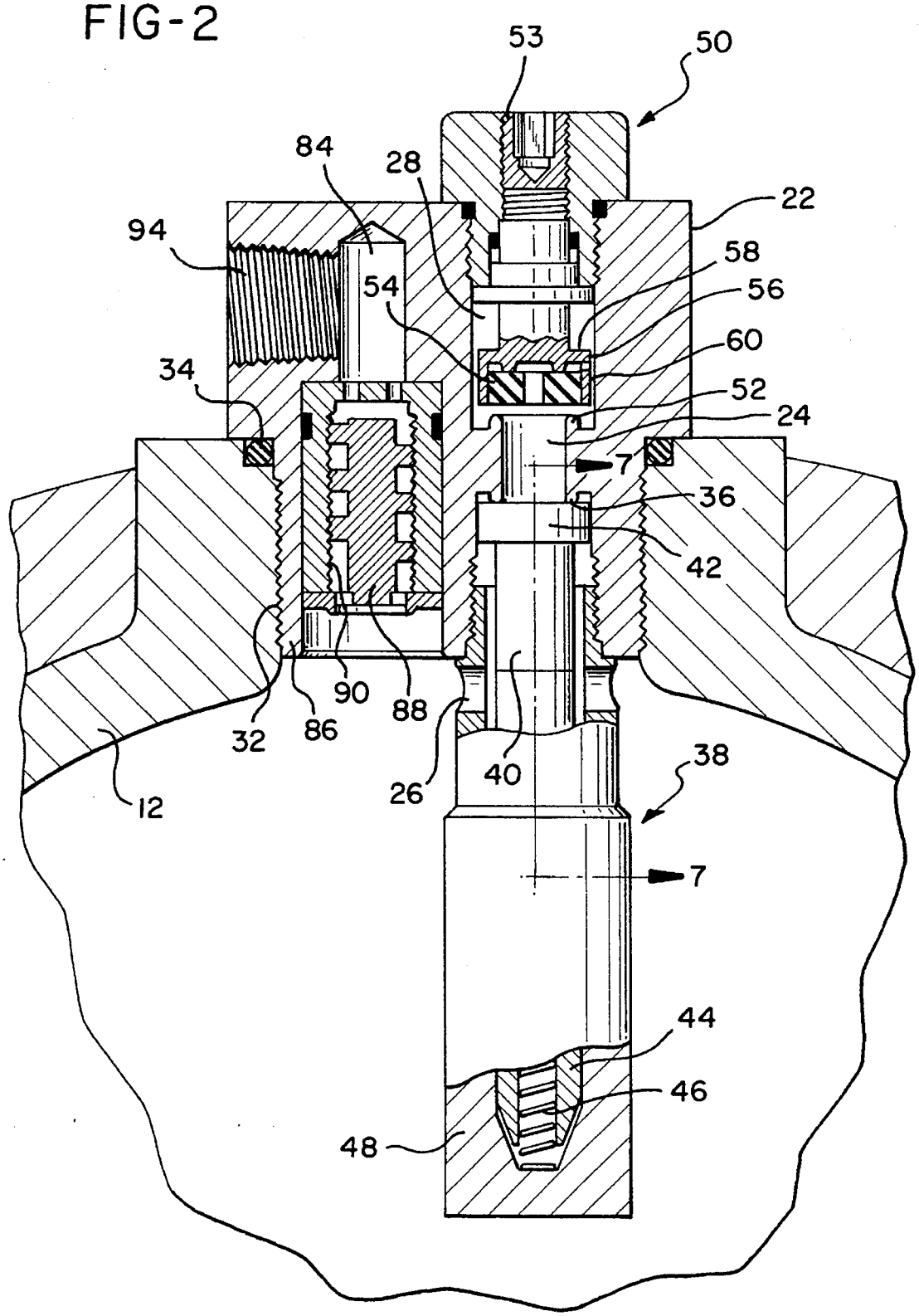
FIG. 2 is a side view, partially in section, of the bidirectional valve of the present invention mounted in a pressurized vessel.
Figure 3:
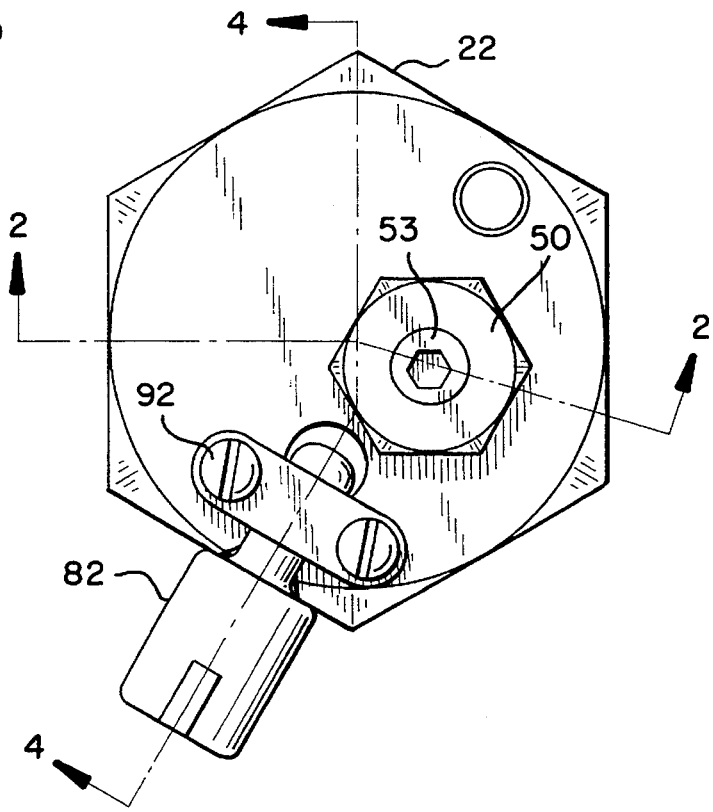
FIG. 3 is a top plan view of the valve of FIG. 2.

Bidirectional valve 14 is shown in FIG. 2 and includes a valve body 22 which has a gas flow passage 24 which extends through the valve body from a first end 26 which communicates with the interior of pressurized vessel 12 to a second end 28 which communicates with outlet ports 30 and 30' (best seen in FIG. 8). One advantage of bidirectional valve 14 of the present invention is that outlet ports 30 and 30' function as common fuel fill (port 30) and fuel supply (port 30') ports, both communicating with gas flow passages 24, which simplifies the piping required in the vehicle.

As shown in FIG. 2, valve body 14 includes external threads 32 which permits the valve to be screwed into a corresponding set of threads on a neck of the pressurized vessel 12. A resilient O-ring 34 provides for sealing between valve body 22 and pressurized vessel 12.

In gas flow passage 24 is valve seat 36. Also positioned in gas flow passage 24 is solenoid valve 38 which includes a poppet body 40, poppet head 42, and solenoid core 44. Poppet body 40 and poppet head 42 are slidable in gas flow passage 24. Solenoid core 44 has a return spring 46 which normally biases poppet head 40, which has a vulcanized resilient O-ring 41, into a sealing relationship with valve seat 36. A solenoid coil 48, when actuated, causes solenoid core 44 to compress spring 46 and move away from poppet body 40 thereby permitting the valve seat to open as will be explained in greater detail below.

As shown, valve seat 36 is below the surface of the opening in cylinder 12 when valve 14 is mounted in position. In the event of a power failure, spring 46 urges poppet body 40 and poppet head 42 into sealing relationship with valve seat 36 to automatically close the valve. Further, even if the top portion of the valve body 14 were to be sheared off in a crash, valve seat 36 would remain intact and sealed by poppet head 42.

As shown in greater detail in FIG. 7, solenoid valve 38 is a pilot assisted or operated valve which permits the use of a solenoid which can be operated continuously with a standard nominal 12 volt dc power supply found in almost all automotive vehicles. Poppet head 42 includes a very small diameter pilot seat orifice 100 which communicates with gas flow passage 24 through a larger diameter orifice 102. Pilot seat orifice 100 is normally sealed against a vulcanized elastomeric seat 104 in poppet body 40.

In operation when fuel is demanded by the system, solenoid valve 38 is energized and is designed to exert just enough force to move poppet body 40 and elastomeric seat 104 away from pilot seat orifice 100. The degree of movement is defined by pin 108 positioned in annular slot 106 in poppet head 42. Once pressurized gas from the pressurized vessel end 26 of gas flow passage 24 is able to flow through pilot seat orifice 100, gas pressure on either side of pilot seat orifice 100 equalizes. Once that gas pressure equalizes, then solenoid valve 38 is able to exert the force needed to pull poppet head 42 away from valve seat 36 and open gas flow passage completely. Conversely, when gaseous compressed fuel under pressure is being supplied to the vessel through fill port 30, the pressure exerted by the fuel is sufficient to automatically open the valve by pushing poppet head 42 away from valve seat 36.

This pilot operation also provides the additional advantage of being less damaging to downstream flow regulators in the fuel supply line as gas pressure in the line increases slowly rather than all at once as would happen with a direct acting valve. Also, as noted above, pilot operation also permits operation of the solenoid under a continuous nominal 12 volt dc source. Direct acting solenoid valves, which must be powerful enough to open the valve seat against a high pressure, need special circuitry to cut back or step down the voltage supplied to the solenoid during operation to avoid coil burnout.

Referring back again to FIG. 2, bidirectional valve 14 of the present invention also includes an optional manual lockdown valve 50 which is positioned in gas flow passage 24 between valve seat 36 and outlet port 30. Manual lockdown valve 50 permits pressure testing of the valve and fuel supply system to insure that they are leak tight under a range of normal operating pressures of up to about 3600 psi. Manual lockdown valve 50 can be tightened using a tool such as an Allen wrench (not shown) to seal against a second valve seat 52 in gas flow passage 24. As shown, the threaded stem 53 may be rotated to tighten resilient gasket 54 against valve seat 52 to seat gas flow passage 24.

Resilient gasket 54, which may be fabricated of Nylon or other suitable material, is carried in a gasket holder 56 on the end of manual lockdown valve 50. Gasket holder 56 includes a top wall 58 and side wall 60 which together form an annular chamber 62 with the gasket 54 mounted therein. To insure that gasket 54 is not unseated from holder 56 during the flow of gas under pressure through gas flow passage 24 and into vessel 12, gasket 54 and gasket holder 56 each have orifices 64 and 66, respectively, therein.

Orifices 64 (through the center of gasket 54) and 66 (through the side wall 60) together form a bleed path for the gas and prevent pressure from building up behind gasket 54 when the manual lockdown valve 50 is in an open position. To ensure that the manual lockdown valve 50 functions as a bidirectional seal in its closed position, annular ridge or seat 68 is provided on the inside of top wall 58 to seal against gasket 54.

Figure 4:
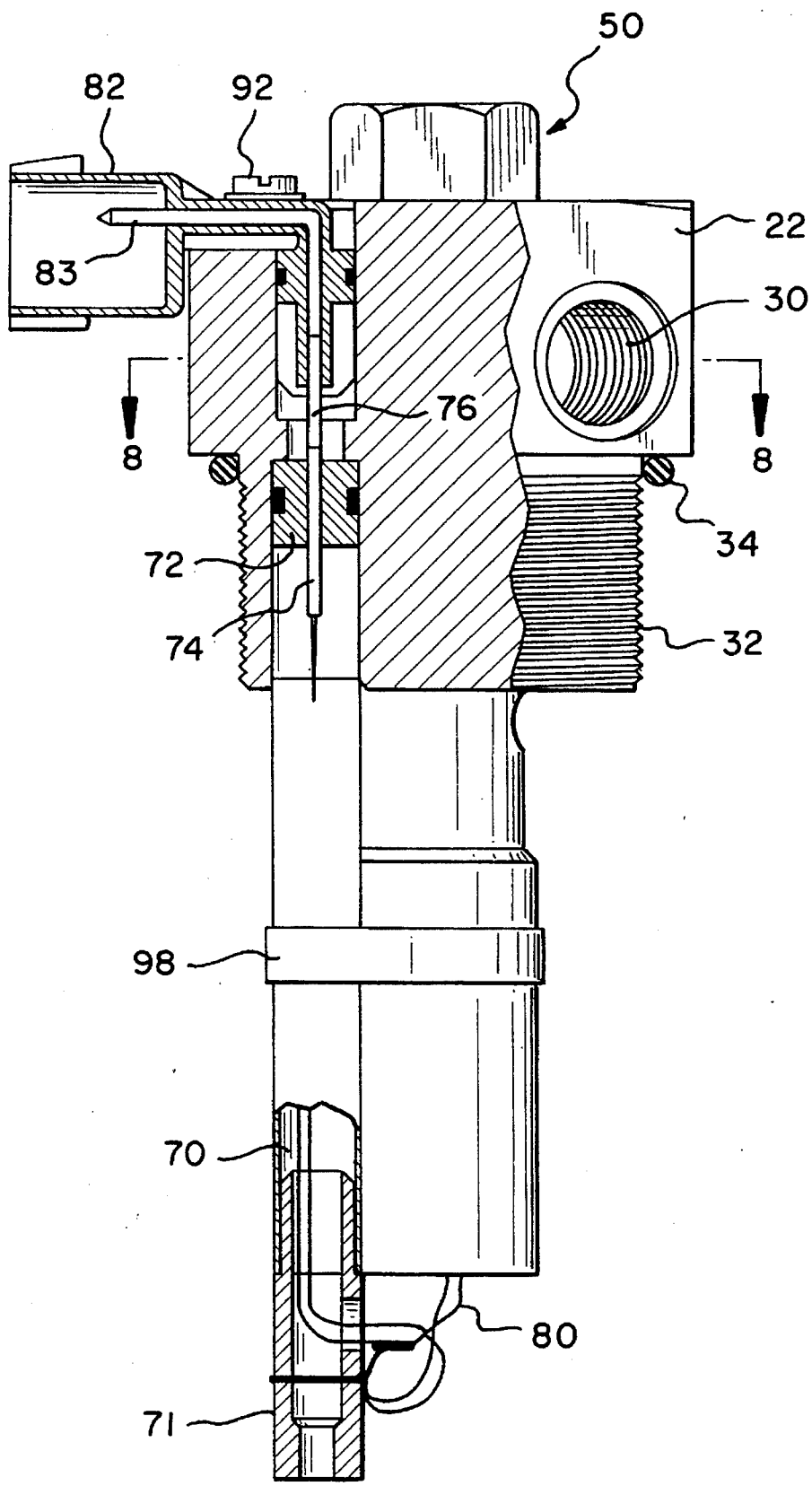
FIG. 4 is a side view, partially in section, taken along line 4—4 in FIG. 3.

As bidirectional valve 14 is designed to be mounted into the interior of pressurized vessel 12, the valve also includes means for connecting the solenoid valve 38 to a source of electrical power such as the vehicle's electrical system. As best shown in FIG. 4, an annular passage 70 inside of tube 71 is provided to provide an electrical pass through for wires 80 to connect up with the solenoid valve. Tube 71 is secured by strap 98 to solenoid valve 38. To insure that the passage 70 is gas tight, a plug 72 of a ceramic material such as aluminum oxide is provided to seal the passage. It has been determined that a ceramic plug provides superior high pressure performance and resistance to gas leaks than plastic parts.

Figure 5:
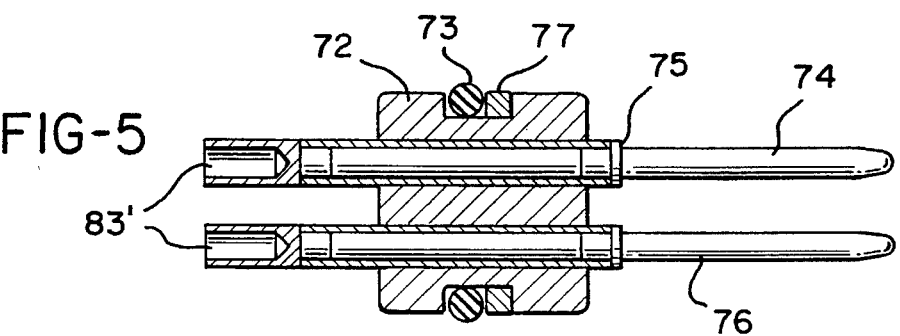
FIG. 5 is an enlarged view, partially in section, of the sealing plug and electrical connector pins shown in FIG. 4.
Figure 6:
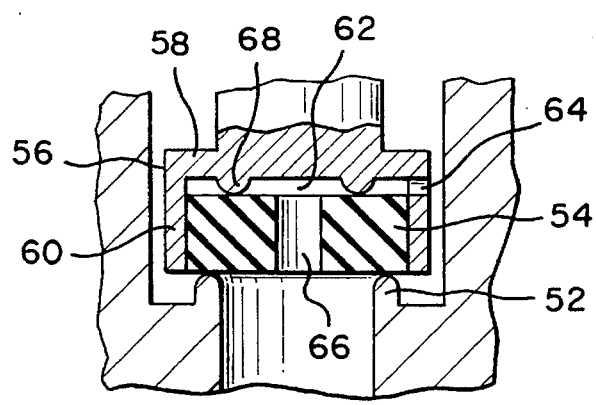
FIG. 6 is an enlarged cross-sectional view of the resilient gasket and gasket holder of the manual lockdown valve shown in FIG. 2.

As best shown in FIG. 5, the gas tight seal is provided by the combination of a resilient O-ring 73 and back-up ring 77 which encircle plug 72. Pins 74 and 76 provide the electrical pathway through plug 72. The pins may be manufactured of any electrically conductive material. A preferred material is a Kovar alloy which has been tin plated. Braze joints 75 seal the entry and exit points of pins 74 and 76 through the plug.

An L-shaped electrical connector 82 has pins 83 which plug into corresponding slots 83' in pins 74 and 76. The electrical connector may be designed to have a standard connection with automotive wiring cables or harnesses. Connector 82 may be secured to valve body 22 by any suitable means such as, for example, screws 92. As shown in FIG. 4, plug 72 is positioned within valve body 22 so that it is at or below the outer surface of pressurized vessel 12 when valve 14 is threaded into position. Tube 71, plug 72, pins 74 and 76, and solenoid valve 38 together form a separate assembly which can be readily assembled to the valve body 22.

Referring back again to FIG. 2, valve body 22 also includes a second gas flow passage 84 which communicates at one end with the interior of pressurized vessel 12 and at the other end communicates with a gas vent port 94 on the valve body. A thermally activated pressure relief device 86 is mounted in gas flow passage 84. Relief device 86 has a fusible alloy 88 therein which is held in place by internal threads 90. During normal operation of bidirectional valve 14, relief device 86 and fusible alloy 88 maintain a gas tight seal. If, however, the temperature adjacent the valve body or pressurized vessel rises above a predetermined limit, fusible alloy 88 melts, opening gas passage 84 and permitting the pressurized gas in vessel 12 to vent to the exterior. Preferably, the thermally activated pressure relief device is an integral CG-9 device commercially available from the Superior Valve Company, Washington, Pa. The alloy in such a device melts at 217° F. As shown, due to the placement of this device in the valve body, it is resistant to tampering and maintains its integrity in the event of a crash.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A bidirectional valve for controlling the flow of a compressed gas to and from a pressurized vessel comprising:

a) a valve body including a gas flow passage extending through said valve body and having first and second ends, said first end of said gas flow passage communicating with the interior of said pressurized vessel and said second end of said gas flow passage communicating with an outlet port on said valve body;

b) a valve seat in said flow passage;

c) a solenoid valve including a poppet body slidable in said gas flow passage, said poppet body including a head for sealing against said valve seat to close said gas flow passage, a solenoid core including a spring for biasing said poppet body and poppet head toward said valve seat, and a solenoid coil for causing said solenoid core to move away from said poppet body; and d) an annular passage through said valve body, a plug sealing said passage and including at least one integral pin extending through said plug, and at least one wire electrically connecting said solenoid valve to said at least one pin.

2. A bidirectional valve as claimed in claim 1 in which said solenoid valve is mounted adjacent said first end of said gas flow passage.

3. A bidirectional valve as claimed in claim 1 including a manual lockdown valve positioned in said gas flow passage between said valve seat and said outlet port for selectively preventing the flow of gas from said pressurized vessel to said outlet port.

4. A bidirectional valve as claimed in claim 3 wherein said gas flow passage includes a second valve seat and said manual lockdown valve includes a resilient gasket for sealing against said second valve seat.

5. A bidirectional valve as claimed in claim 4 wherein said manual lockdown valve further includes a gasket holder having a top wall and side walls forming an annular chamber with said resilient gasket mounted therein, said gasket holder and gasket each having respective orifices therein which form a bleed path for gas when said manual lockdown valve is in an open position.

6. A bidirectional valve as claimed in claim 5 wherein said gasket holder includes an annular ridge on the interior of said top wall.

7. A bidirectional valve as claimed in claim 1 in which said plug is formed of a ceramic material and said pin is brazed to said plug.

8. A bidirectional valve as claimed in claim 7 further including an electrical connector which mates with said at least one pin on the outlet end of said annular passage.

9. A bidirectional valve as claimed in claim 1 further including common fuel fill and fuel supply ports communicating with said gas flow passage.

10. A bidirectional valve for controlling the flow of a compressed gas to and from a pressurized vessel comprising:

a) a valve body including a gas flow passage extending through said valve body and having first and second ends, said first end of said gas flow passage communicating with the interior of said pressurized vessel and said second end of said gas flow passage communicating with an outlet port on said valve body;

b) first and second valve seats in said flow passage;

c) a solenoid valve including a poppet body slidable in said gas flow passage, said poppet body including a head for sealing against said first valve seat to close said gas flow passage, a solenoid core including a spring for biasing said poppet body and poppet head toward said first valve seat, and a solenoid coil for causing said solenoid core to move away from said poppet body; and d) a manual lockdown valve positioned in said gas flow passage between said second valve seat and said outlet port for selectively preventing the flow of gas from said pressurized vessel to said outlet port, said manual lockdown valve including a resilient gasket for sealing against said second valve seat and a gasket holder having a top wall and side walls forming an annular chamber with said resilient gasket mounted therein, said gasket holder and gasket each having respective orifices therein which form a bleed path for gas when said manual lockdown valve is in an open position.

11. A bidirectional valve as claimed in claim 10 wherein said gasket holder includes an annular ridge on the interior of said top wall.

12. A bidirectional valve for controlling the flow of a compressed gas to and from a pressurized vessel comprising:

a) a valve body including a gas flow passage extending through said valve body and having first and second ends, said first end of said gas flow passage communicating with the interior of said pressurized vessel and said second end of said gas flow passage communicating with an outlet port on said valve body;

b) a valve seat in said flow passage;

c) a solenoid valve including a poppet body slidable in said gas flow passage, said poppet body including a head for sealing against said valve seat to close said gas flow passage, a pilot seat orifice in said head and communicating with said gas flow passage and means for sealing said pilot seat orifice, a solenoid core including a spring for biasing said poppet body and poppet head toward said valve seat, and a solenoid coil for causing said solenoid core to move away from said poppet body; and d) means for connecting said solenoid valve to a source of electrical power, said means comprising an annular passage through said valve body, a plug sealing said passage and including at least one integral pin extending through said plug, and at least one wire electrically connecting said solenoid valve to said at least one pin.

13. A bidirectional valve as claimed in claim 12 in which said plug is formed of a ceramic material and said pin is brazed to said plug.

14. A bidirectional valve as claimed in claim 13 further including an electrical connector which mates with said at least one pin on the outlet end of said annular passage.

15. In combination, a fuel supply inlet for supplying a compressed gas fuel, a plurality of pressurized vessels for storing said compressed gas fuel, a fuel supply line for supplying said compressed gas fuel to the engine of a vehicle, and a plurality of bidirectional valves for controlling the flow of a compressed gas to and from said pressurized vessels, said bidirectional valves comprising:

a) a valve body including a gas flow passage extending through said valve body and having first and second ends, said first end of said gas flow passage communicating with the interior of a respective one of said pressurized vessels and said second end of said gas flow passage communicating with fuel fill and supply ports integral with said valve body;

b) a valve seat in said gas flow passage; and c) a solenoid valve including a poppet body slidable in said gas flow passage, said poppet body including a head for sealing against said valve seat to close said gas flow passage, a solenoid core including a spring for biasing said poppet body and poppet head toward said valve seat, and a solenoid coil for causing said solenoid core to move away from said poppet body;

said fuel supply inlet communicating with one of said fuel fill ports and said fuel supply line communicating with one of said fuel supply ports on one of said bidirectional valves, said bidirectional valves communicating with one another through supply lines between respective outlet ports on said bidirectional valves.

16. The combination of claim 15 in which the outlet ports on said bidirectional valves are connected together in series.

* * * * *